United States Patent
Pfeilschifter et al.

(10) Patent No.: US 11,097,626 B2
(45) Date of Patent: Aug. 24, 2021

(54) VEHICLE ELECTRICAL SYSTEMS, CHARGING SYSTEM, CHARGING STATION, AND METHOD FOR TRANSMITTING ELECTRICAL ENERGY

(71) Applicant: Continental Automotive GmbH, Hannover (DE)

(72) Inventors: Franz Pfeilschifter, Regensburg (DE); Philip Brockerhoff, Regensburg (DE); Martin Brüll, Barbing (DE); Paul-Markus Schweizer-Berberich, Berlin (DE); Matthias Töns, Regensburg (DE); Edmund Schirmer, Nuremberg (DE)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 211 days.

(21) Appl. No.: 16/316,107

(22) PCT Filed: Jun. 27, 2017

(86) PCT No.: PCT/EP2017/065827
§ 371 (c)(1),
(2) Date: Jan. 8, 2019

(87) PCT Pub. No.: WO2018/010948
PCT Pub. Date: Jan. 18, 2018

(65) Prior Publication Data
US 2019/0210475 A1    Jul. 11, 2019

(30) Foreign Application Priority Data
Jul. 11, 2016  (DE) .................... 10 2016 212 543.5

(51) Int. Cl.
*B60L 53/10* (2019.01)
*B60L 53/14* (2019.01)
(Continued)

(52) U.S. Cl.
CPC ............... *B60L 53/14* (2019.02); *B60L 53/11* (2019.02); *B60L 53/16* (2019.02); *B60L 53/20* (2019.02);
(Continued)

(58) Field of Classification Search
CPC .......... B60L 53/00; B60L 53/10; B60L 53/50; B60L 53/53; B60L 53/62; B60L 53/66;
(Continued)

(56) References Cited

U.S. PATENT DOCUMENTS 9,434,263 B2    9/2016 Khan et al.
9,764,650 B2    9/2017 Böhm et al.
(Continued)

FOREIGN PATENT DOCUMENTS

DE    102010041253 A1    3/2012
DE    102013217574 A1    4/2014
(Continued)

OTHER PUBLICATIONS

International Search Report and Written Opinion for International Application No. PCT/EP2017/065827, dated Sep. 28, 2017—10 pages.
(Continued)

*Primary Examiner* — Nathaniel R Pelton
*Assistant Examiner* — Mohammed J Sharief
(74) *Attorney, Agent, or Firm* — RatnerPrestia

(57) ABSTRACT

A vehicle electrical system having an electrical energy store, a direct voltage converter and a direct current transmission connection is described. The direct current transmission connection is connected to the energy store via the direct voltage converter. The vehicle electrical system also has a bypass switch which connects the electrical energy store in a switchable fashion to the direct voltage transmission connection. In addition, a method, a charging system, a (Continued)

charging station and a further vehicle electrical system are described.

10 Claims, 3 Drawing Sheets

(51) Int. Cl.
　　*B60L 53/22*　　(2019.01)
　　*H02J 7/00*　　(2006.01)
　　*B60L 53/20*　　(2019.01)
　　*B60L 53/16*　　(2019.01)
　　*H02M 3/156*　　(2006.01)

(52) U.S. Cl.
　　CPC ............... *B60L 53/22* (2019.02); *H02J 7/00* (2013.01); *H02J 7/0027* (2013.01); *H02M 3/156* (2013.01); *B60L 2210/10* (2013.01); *B60L 2240/547* (2013.01); *Y02T 10/70* (2013.01); *Y02T 10/7072* (2013.01); *Y02T 10/72* (2013.01); *Y02T 10/92* (2013.01); *Y02T 90/12* (2013.01); *Y02T 90/14* (2013.01)

(58) Field of Classification Search
　　CPC .......... B60L 53/14; B60L 53/20; B60L 53/11; B60L 53/16; B60L 53/22; B60L 2210/10; B60L 2240/547; B60L 53/30; B60L 2240/527; H02J 7/00; H02J 7/0027; H02M 3/156; Y02T 10/70; Y02T 10/72; Y02T 90/12; Y02T 90/14; Y02T 10/92; Y02T 10/7072; B60Y 2200/91; B60Y 2200/92
　　USPC .................................................. 320/104, 109
　　See application file for complete search history.

(56) References Cited

U.S. PATENT DOCUMENTS

| | | | |
|---|---|---|---|
| 2012/0181990 A1* | 7/2012 | Asakura | B60L 53/30 320/137 |
| 2014/0021780 A1* | 1/2014 | Choi | H02M 3/158 307/9.1 |
| 2015/0054469 A1* | 2/2015 | Jang | B60L 11/1861 320/162 |

FOREIGN PATENT DOCUMENTS

| | | | |
|---|---|---|---|
| WO | 2013093963 A1 | 6/2013 | |
| WO | 2013160031 A1 | 10/2013 | |
| WO | WO-2013160031 A1 * | 10/2013 | ............. B60L 58/20 |

OTHER PUBLICATIONS

German Examination Report for German Application No. 10 2016 212 543.5, dated Apr. 11, 2017—9 pages.
Korean Notice to Submit Response for Korean Application No. 10-2019-7003503, dated Aug. 26, 2020, with translation, 12 pages.

* cited by examiner

VEHICLE ELECTRICAL SYSTEMS, CHARGING SYSTEM, CHARGING STATION, AND METHOD FOR TRANSMITTING ELECTRICAL ENERGY

CROSS REFERENCE TO RELATED APPLICATIONS

This application is the U.S. National Phase Application of PCT International Application No. PCT/EP2017/065827, filed Jun. 27, 2017, which claims priority to German Patent Application No. 10 2016 212 543.5, filed Jul. 11, 2016, the contents of such applications being incorporated by reference herein.

BACKGROUND OF THE INVENTION

Motor vehicles having an electrical drive, i.e. electric vehicles and hybrid vehicles, comprise an electrical energy store for supplying power to the electrical drive. Electric vehicles and plug-in hybrids are equipped with a terminal by means of which power can be transmitted from a stationary electrical supply system (local or public) to the energy store for the purpose of charging the latter. If need be, the vehicles are also equipped to feed electric power back to the supply system.

Transmitting electric power between supply system and vehicle requires power electronics components, in particular for controlling the transmission of power. In particular in the case of high charging power levels, expensive components are necessary, in order, for example, to charge particularly quickly.

SUMMARY OF THE INVENTION

An aspect of the invention is a possible way of permitting the expenditure on such components to be reduced or of also being able to achieve high charging power levels with reduced expenditure on the power electronics.

It is proposed to bypass, in a vehicle electrical system, a direct voltage converter (referred to below as DCDC converter) which connects an electrical energy store to a direct current transmission connection (referred to below as DC plug-in) if during the charging process a voltage is applied to the power inverter which would be suitable to be fed directly to the energy store (i.e. load limits of the energy store are not exceeded). In other words, for example in the case of an excessively low state of charge or an excessively low voltage of the energy store the power is transmitted via the DCDC converter, in particular in order to adapt the voltage of the DC plug-in to a (lower) voltage for the energy store. If the voltage or the state of charge of the energy store is sufficiently adapted to the voltage at the DC plug-in (which results, for example, from rectification of an oscillating voltage of a supply network), the charging energy is no longer transmitted via the DCDC converter but rather directly from the DC plug-in to the battery. This becomes possible if the DCDC converter is bypassed, i.e. if a bypass switch is closed (in parallel with the DCDC converter). This can also be applied to a charging station.

As result, for example, a direct voltage converter (DCDC converter) which is used for traction can also be used for charging within the vehicle. If the traction power is low compared to the charging power, it is not necessary to configure the DCDC converter for the higher charging power. Instead, in order to achieve a high charging power level the bypass switch is closed (in the vehicle and/or the bypass switching device in the charging station). This can be carried out in a range in which the plug-in-voltage corresponds essentially to the energy store voltage, with the result that a high switching current is not produced or the energy store is overloaded if the switch is closed. The DCDC converter in the charging station can also firstly be used to increase the voltage which is output by the charging station until the deviation from the energy store voltage is below a predefined magnitude. Starting from this point, the switch which bypasses the DCDC converter of the charging station is closed, and charging can be carried out with a relatively high power. In this context the DCDC converter of the charging station can also be configured for comparatively low power levels, since a rapid charging process is carried out with the switch closed. The switch which bypasses the DCDC converter of the vehicle electrical system is referred to as a bypass switch. For the purpose of differentiation, the switch which bypasses the DCDC converter is denoted by a synonym, namely as the bypass switching device.

A concept of the procedure described here is represented by a method for transmitting electrical energy. The energy is transmitted between an energy store of a vehicle electrical system and a charging station via a direct voltage converter of the vehicle electrical system. Alternatively, the energy is transmitted between the energy store and the charging station via a fixed direct voltage converter of the charging station. In addition, the energy can be transmitted via both direct voltage converters.

The direct voltage converter or the direct voltage converters is/are bypassed if the voltage across the respective voltage converter is below a predefined magnitude. The voltage difference relates, in particular, to the open-circuit voltage of the energy store to which the direct voltage converter is directly connected (in the case of the vehicle-side direct voltage converter) or to which the direct voltage converter is indirectly connected (in the case of the charging-station-side direct voltage converter).

The direct voltage converter or converters is/are bypassed if the voltage difference between that voltage which is present at the side of the respective voltage converter which faces away from the energy store and the open-circuit voltage of the energy store is below a predefined magnitude. In order to determine whether the voltage difference is below the predefined magnitude or not, the value of the voltage difference can be compared with the magnitude. In particular, the voltage difference corresponds to the open-circuit voltage of the energy store minus the voltage which, as mentioned, is present at the voltage converter. The open-circuit voltage can be measured by means of voltage measurement in the case of a current flow of essentially zero, by means of voltage measurements and associated current measurements in the case of different currents, by means of interrogation of a battery management unit or the like.

In particular, the energy is transmitted via an inverter of the charging station, which inverter is connected between a fixed supply alternating current network and the direct current converter of the charging station. The energy can be transmitted to the vehicle electrical system (charging) or away from it (feeding back). Preferably, transmission is initially carried out until a voltage difference (in particular with respect to the open circuit voltage of the energy store) across the converter which is bypassed later is below a predefined magnitude, wherein this magnitude corresponds to a switching power which is not higher than the maximum permissible switching power of a switch by means of which the bypassing is carried out. The voltage state of the energy store can be transmitted from the vehicle electrical system as a data signal to the charging station, wherein the voltage state can be characterized by the open-circuit voltage or terminal voltage (or also by the state of charge) of the energy store. In addition, a fault signal can be transmitted from the vehicle electrical system to the charging station, which fault signal ends a bypassing operation occurring at the converter of the charging station, independently of the voltage state of said converter. During the bypassing, the converters or the converter are/is preferably inactive.

In addition, a vehicle electrical system having an electric energy store, a direct voltage converter (DCDC converter) and a direct current transmission connection (DC plug-in) is described. The DC plug-in is connected to the energy store via the DCDC converter. The DCDC converter connects the DC plug-in to the energy store.

The vehicle electrical system has a bypass switch. The latter connects the energy store to the DC plug-in in a switchable fashion. In particular, the bypass switch is connected in parallel with the DCDC converter and/or in parallel with the sides of the DCDC converter. The bypass switch connects the two sides of the DCDC converter between which the voltage conversion takes place. In other words, the bypass switch bypasses the DCDC converter (in a switchable fashion).

A control unit is provided which actuates the bypass switch in a closed state if a direct connection between the DC plug and energy store would give rise to a flow of energy which is not above a load limit of the energy store. Another way of considering this is that the bypass switch is closed only if the closing of the bypass switch would bring about loading (by the switching current) of the bypass switch which would be below a predefined switching current magnitude. In particular, the bypass switch is closed only when the voltage difference across the DCDC converter (i.e. the difference between the voltage at the energy store, in particular the open-circuit voltage thereof, and the voltage of the DC plug) is essentially zero. Therefore, a decision about the switched state of the bypass can be based on the loading of the energy store of the bypass switch (during closing). In particular, the bypass switch is closed only when the direct connection between the DC plug and the energy store would give rise to a flow of energy which is not above a load limit of the energy store.

The estimation as to whether the load limit is reached or not is preferably based on the voltage difference between the voltage of the energy store and the voltage at the DC plug-in. This corresponds to the voltage across the DCDC converter, i.e. the voltage difference between the sides of the DCDC converter. This is related, in particular, to the open-circuit voltage of the energy store which is directly or indirectly connected to one side of the respective DCDC converter. If this relates to the terminal voltage, the current which flows is taken into account such that the effect that the switching power level or the switching current of the bypassing switch is below a predefined switching power level or below a predefined maximum switching current. If said switching power level or switching current is lower than a predetermined magnitude, it is assumed that the load limit is not exceeded and/or that a maximum switching current to the bypass switch is not exceeded. Otherwise, it is assumed that a load limit would be exceeded by the closing of the bypass switch or by the closed bypass switch. The load limit can relate to the bypass switch or to the energy store.

A charging process can therefore be carried out by means of the vehicle electrical system as follows: charging of the energy store via the DCDC converter if the voltage state of the energy store deviates from the voltage at the DC plug-in by more than a predefined (permissible) deviation magnitude. In addition, charge of the energy store via the bypass switch is provided (or closing of the bypass switch) if the deviation between the specified variables is not greater than a predefined magnitude. The bypass switch is closed, in particular, if the energy store has approximately the direct voltage (terminal voltage or open-circuit voltage) which results from rectifying an alternating voltage.

If a fixed direct voltage converter is located in the charging station, it can also be bypassed if this does not cause load limits of the energy store or the switch with which the bypass is carried out to be exceeded.

Charging of the energy store via the bypass switch is preferably carried out with a higher power level than charging of the energy store via the DCDC converter. The two power levels can have a ratio of 2:1, 3:1 or 4:1. In other words, the DCDC converter can be configured for a lower power level than the maximum charging power of the energy store, for example for a power level of not more than 10%, 15%, 20% or else of not more than 40%, 50% or 60% of the maximum charging power level of the energy store or an inverter within the charging station. This configuration of the power level can apply to the DCDC converter within the on-board electrical system, to the DCDC converter within the charging station or to both. Different values can be used for the DCDC converter within the on-board electrical system than for the DCDC converter within the charging station. The DCDC converter of the on-board electrical system converter can have a nominal power level which is lower than the maximum charging power level of the energy store. The DCDC converter of the on-board electrical system converter can have a nominal power level which is not more than 10%, 15%, 20% or else of not more than 40%, 50% or 60% of the maximum charging power of the energy store.

The DCDC converter of the charging station can have a nominal power level which is lower than the nominal power level of the inverter of the charging station. The DCDC converter of the charging station can have a nominal power level which is not more than 10%, 15%, 20% or else of not more than 40%, 50% or 60% of the nominal power level of the inverter of the charging station.

The bypass switch is configured for power levels or currents which correspond at least to the maximum power levels or maximum currents of the energy store or are, in particular, at least 20% or else at least 40% above them. This applies to states in which switching is not carried out, i.e. for the continuous load of the bypass switch and not for the switching power level.

A power inverter which connects an electrical machine to the DCDC converter can be provided in the vehicle electrical system. In the driving mode, the electrical machine can therefore be supplied with energy from the energy store via the DCDC converter and the power inverter (in this sequence).

The DCDC converter is, in particular, a step-up converter, for example a synchronous converter. The energy store is, in particular, a high-voltage store (i.e. with a nominal voltage of at least 60V, 120V, 240V, 360V or 380 V), for example a high-voltage accumulator. The energy store is, in particular, a lithium-based accumulator (for example an Li-ion accumulator). The energy store is preferably an accumulator or in other words comprises a stack of galvanic cells (in particular secondary cells) which are connected to one another as energy storage units of the energy store. The electrical energy store is, particular, an accumulator, for example a lithium-based accumulator (for example a lithium-ion accumulator). The electrical energy store may be a traction storage battery. The energy store can have a rated voltage of 40-60 V, in particular of 48 V, and can in particular have a rated voltage of more than 100 volts, in particular of at least 200 or 300 V, for example of 350-420 V. The electrical machine is in particular a three-phase machine. The electrical machine has multiple phases, in particular three phases or six phases. The electrical machine may be a separately excited or permanently excited electrical machine. There can be provision that the electrical machine has a star point; other configurations provide a triangular configurations of the electrical machine. The positive rail may be connected to the phase current terminals (of the power inverter) via the star point.

The DC transmission terminal can comprise a plug-in inlet, i.e. an electromechanical plug connection element that can be fitted in the outer shell of a vehicle. The DC transmission terminal is configured to be connected to a charging plug (or more generally: plug connector).

A control unit may be provided which actuates the bypass switch. In addition, it is possible to provide this control unit or a further control unit which actuates the direct voltage converter and, if appropriate, the power inverter. The control unit is connected in an actuating fashion to the bypass switch and, in particular, to the direct voltage converter. In an inversion mode of the control unit, the power inverter is actuated to produce phase voltages present at the phase terminals from the DC voltage of the energy store. In an (optional) recuperation mode, the control unit actuates the power inverter to produce a charging voltage at the energy store from the phase voltages at the phase terminals. In an (optional) feedback mode, the control unit actuates the power inverter to produce a feedback voltage at the direct voltage transmission terminal from the voltage present at the energy store of the vehicle electrical system.

In a charging mode, the control unit actuates the DCDC converter to produce a charging voltage at the energy store from the voltage present at the direct voltage transmission terminal. This is carried out by the control unit if the bypass switch is open. In the closed state, the control unit does not actuate the DCDC converter or actuates it in such a way that no current flows through it (for example as a result of opening all the switches of the DCDC converter).

The DCDC converter has semiconductor switches or switching elements. These are preferably transistors, in particular field-effect or bipolar transistors, for example MOSFETs or IGBTs.

The bypass switch can be located, in particular, in the positive rail of the vehicle electrical system. In this context, the DCDC converter and the energy store have a common ground (with the result that the bypass switch switches or bypasses in the positive rail).

The DC plug-in preferably has a negative potential which is connected to a negative connection of the DCDC converter. The direct voltage transmission connection can have a positive potential which is connected to a positive connection of the direct voltage converter. The bypass switch preferably connects the positive connection of the DCDC converter to a positive pole of the electrical energy store.

As mentioned, the vehicle electrical system also has a control unit. This is connected in an actuating fashion to the direct voltage converter and/or to the bypass switch. The control unit is also connected to the energy store, in particular in order to receive signals therefrom, for example measurement signals, state signals or signals derived therefrom. The control unit is configured to determine the voltage of the energy store. This indicates, in particular, whether the energy store is in a state in which a supply via the bypass switch would not cause overloading of the energy store or of the bypass switch. The deviation is a measure of what power level or what current or what charging voltage can be fed to the energy store, and is in particular, a measure for how far the load limit (in terms of current, voltage or power level) of the energy store or the load limit of the bypass switch (in particular the maximum switching current) is from an operating point which would result if the DC plug-in were to be connected directly to the energy store via the bypass switch. The deviation can be indicated as a margin which indicates the distance from the load limit of the energy store.

The control unit is also connected to the direct current transmission connection and is configured to determine the voltage thereof. The control unit can have a voltage measuring unit for this purpose or a data input via which the voltage is received as a value from a battery management unit of the energy store of the control unit.

The control unit is also configured to determine a deviation between the voltage state of the energy store and the voltage of the direct current transmission connection. To this end, the control unit can have a difference forming device or a computing unit for this purpose. The control unit is configured to provide the bypass switch in a closed state (for example by outputting a corresponding actuation signal) if the deviation is not greater than a predefined magnitude. The control unit is configured to provide the bypass switch in an open state if the deviation is greater than the predefined magnitude. The magnitude can drop starting from a predetermined temperature value as the temperature increases, can drop with the temperature below a predetermined further temperature value, can drop with increasing aging, can decrease with decreasing internal resistance, or can be constant. The aging, the internal resistance and the temperature relate to the energy store or to the bypass switch or bypass switching element.

The control unit is also configured to determine the open-circuit voltage from the terminal voltage of the energy store (for example on the basis of a measured energy store current), in order to use this variable as a voltage state. In addition, the control unit can be configured to determine the voltage state (in the sense of an open-circuit voltage) from the state of charge and/or the state of health (obtained from a battery management unit of the energy store). On the basis of this estimation or prognosis, the bypass switch is actuated, in particular in such way that the load limit or the current absorption capacity of the energy store is not exceeded.

The voltage state can be represented in the form of a value which represents a state of charge, a terminal voltage, an open-circuit voltage or a maximum charging current. The control unit is configured to actuate the bypass switch according to this value.

The control unit (of the vehicle electrical system) can also be configured, in the case of a current absorption capacity which is above the threshold value, to transfer a current value, voltage value or power value as a setpoint value, in particular to a control unit of the charging station which is configured to output to the DC plug-in a current, a voltage or a power level which corresponds to the setpoint value. The control unit (of the vehicle electrical system) can be configured, in the case of a current absorption capacity which does not exceed the threshold value, to output a current value, voltage value or power value as a setpoint value to the direct voltage converter In other words, the control unit is configured, in the case of insufficient current absorption capacity of the energy store (i.e. if the threshold value is not exceeded or if the load limit would be exceeded with the bypass switch closed) to actuate the DCDC converter of the vehicle electrical system in order to set the charging power, the charging current and/or the charging voltage, and is otherwise configured to output a control signal (i.e. a setpoint value) which can be received by a fixed control unit and used as a setpoint value. When the bypass switch closes, the actuation of the DCDC converter (on the vehicle side) is therefore changed by the control unit in accordance with the setpoint value to the actuation of the charging station or of the converter thereof. The control unit of the vehicle electrical system is configured to actuate the switches of the DCDC converter of the vehicle electrical system according to an open state if the bypass switch is closed (and therefore the DCDC converter of the vehicle electrical system is bypassed).

The control unit can also have a transmitter unit. Said transmitter unit is configured to transmit the voltage state of the energy store, the deviation or a switched state of the bypass switch of the vehicle electrical system, in particular to a receiver unit of the charging station.

There can be provision that the predefined magnitude is not more than 10%, 5%, 2% or 1% of the nominal voltage of the energy store 10.

The control unit (of the vehicle electrical system) is, in particular, connected in an actuating fashion to the direct voltage converter. The control unit is configured to provide the latter in an inactive state (for example with opened switching elements of the DCDC converter) when the bypass switch is closed. The control unit is also configured to provide the DCDC converter in an active state when the bypass switch is open. This can be done by direct actuation of the DCDC converter by means of the control unit, or by actuation of a driver circuit or actuation circuit which generates the switching signals for the switching elements of the DCDC converter.

In addition, a charging system (in the sense of a device) is described. The charging system comprises a mobile unit which is to be charged (the vehicle which has a vehicle electrical system described here, and a charging station. The charging station has a (fixed) inverter and also has a (fixed) direct voltage charging connection and a (fixed) direct voltage converter. A fixed switch is connected in parallel with the fixed direct voltage converter. Said switch is configured to be actuated by signal which is transmitted by the vehicle electrical system, and said switch is configured to be actuated according to a setpoint value which is transmitted by the vehicle electrical system. In addition it can be provided that the (fixed) inverter and/or the (fixed) direct voltage converter are/is configured to operate according to a setpoint value which is transmitted by the vehicle electrical system. As a result, the fixed direct voltage converter can also be bypassed if a direct transmission of rectified alternating voltage of the supply network would not bring about overloading of the energy store. Bypassing is not carried out on the charging station side if this would bring about overloading of the energy store (of the vehicle electrical system). Instead of an inverter, a (controlled or uncontrolled) rectifier can also be used in the charging station.

The charging station can have a receiver unit which is configured to receive the voltage state of the energy store, the deviation or a switched state of the bypass switch of the vehicle electrical system, for example by receiving a signal which is transmitted by the control unit of the vehicle electrical system or by a transmitter unit of this control unit. The control unit can be connected downstream of the receiver unit, or the receiver unit can form part of the control unit. The control unit is configured to obtain the respective data (voltage state, deviation and/or switched state) from the receiver unit.

The fixed control unit (i.e. the control unit of the charging station) is connected, in particular, to a connecting point between the fixed direct voltage charging connection and the fixed inverter. This control unit is configured to determine the voltage at the connecting point.

The fixed control unit is preferably also configured to determine a deviation between the voltage state of the energy store and the voltage of the connecting point. The fixed control unit is configured to provide the fixed bypass switch in a closed state if the deviation is not greater than a predefined magnitude. The fixed control unit is configured to provide the bypass switch in an open state if the deviation is greater than a predefined magnitude. This magnitude can, as stated above, also depend on the aging, the temperature and/or the internal resistance of the energy store or the bypass switch, or else on the state of charge of the energy store.

The vehicle electrical system can, as mentioned, have an alternating current transmission connection. The latter can be connected via windings of the electrical machine to the power inverter of the vehicle electrical system (or to the alternating current side thereof). The alternating current transmission connection can have multiple phases, for example 3 phases. A direct current side of the power inverter of the vehicle electrical system is connected to the DCDC converter and to the DC plug-in of the vehicle electrical system.

The vehicle electrical system is in particular the on-board electrical system of a plug-in hybrid motor vehicle or of an electric motor vehicle.

In addition, a charging station is described, in particular a charging station which can be used in the charging system. The charging station is equipped with a fixed inverter, a fixed direct voltage charging connection and a fixed direct voltage converter. The direct voltage converter connects the inverter to the fixed direct voltage charging connection. A (fixed) bypass switch is connected in parallel with the fixed direct voltage converter. The former bypasses (insofar as it is in the closed estate) the fixed direct voltage converter (i.e. the DCDC converter of the charging station). The charging station has a fixed control unit. Said control unit is connected in an actuating fashion to the bypass switch.

The charging station can have a receiver unit. Said receiving unit can be configured to receive a voltage state of an energy store of a vehicle electrical system which is connected to the charging station, a switching command or a switched state of a bypass switch of a (connected) vehicle electrical system. The receiver unit is preferably connected to the fixed control unit. The control unit is configured, in particular, to provide the bypass switch in a closed state if the voltage state of the energy store no longer deviates by a predefined magnitude from a voltage which is present between the inverter and the fixed direct voltage converter if a switching command for closing the bypass switch is present, or if the switched state of the bypass switch (40) of the vehicle electrical system is closed. The "or" links here only the individual features of the event dependence, not the events themselves. The control unit is otherwise configured to actuate the fixed bypass switch according to an open switched state.

In addition, a vehicle electrical system having an electrical energy store, a direct voltage converter (also referred to as DCDC converter) and a power inverter is described. The energy store, the direct voltage converter and the power inverter preferably correspond to the energy store, direct voltage converter and power inverter mentioned above and in the text which follows. The power inverter is connected to the energy store via the direct voltage converter. An electrical machine (electric motor) is connected downstream of the power inverter. The electrical machine is connected to the energy store via the power inverter, directly via the bypass switch described below, or is connected indirectly to the energy store via the DCDC converter. The vehicle electrical system also has a bypass switch which connects the electrical energy store in a switchable fashion to the power inverter. The bypass switch preferably corresponds to the bypass switch which is mentioned above and in the text which follows and which bypasses the sides of the DCDC converter in the same way. In particular, the bypass switch is connected in parallel with the DCDC converter and/or in parallel with the sides of the DCDC converter. The bypass switch connects the two sides of the DCDC converter between which the voltage conversion takes place. In other words, the bypass switch bypasses the DCDC converter (in a switchable fashion). The vehicle electrical system has, in particular, a control unit. The control unit can be connected in an actuating fashion to the bypass switch and, in particular, also to the DCDC converter. The control unit is configured to receive a boost signal. The boost signal represents a particularly high power request to the inverter. The boost signal can relate to a traction state (in which the power inverter outputs alternating power). The boost signal can also relate to a recuperation state (in which the power inverter absorbs alternating power). The control unit is configured to provide the bypass switch in a closed state if the boost signal is present, and to provide it in an open state if the boost signal is not present. The power inverter is supplied directly from the energy store by means of the connected bypass switch. As a result, the power is not limited by the maximum power level of the DCDC converter (determined by the configuration of the DCDC converter). The nominal power level of the power inverter is preferably higher than the nominal power level of the DCDC converter. The power inverter preferably has a nominal power level which is at least 150%, 200%, 400% or 600% of the nominal power level of the DCDC converter. The control unit specified in this paragraph can correspond to the control unit which is mentioned in the following passages and in the preceding passages. The control unit can be configured to provide the bypass switch in a closed state if the boost signal is present or if the deviation between the voltage state of the energy store and the voltage of the direct current transmission connection is not greater than a predefined magnitude. The control unit can be configured to provide the bypass switch in an open state if the boost signal is not present or if the deviation between the voltage state of the energy store and the voltage of the direct current transmission connection is greater than the predefined magnitude. Therefore, the bypass switch can be used for a plurality of functions: on the one hand for directly coupling the energy store to the power inverter if a particularly high traction power level or recuperation power level is requested, and on the other hand for directly coupling the energy store to the direct voltage transmission connection if the voltage state of the energy store (in particular the open-circuit voltage) no longer deviates by more than a predefined magnitude from the voltage of the direct voltage transmission connection. In both cases, the DCDC converter is bypassed by the bypass switch in order to connect the energy store directly to a power source (charging station or electric motor as generator) or power sink (charging station during the feeding back or electric motor as drive). Otherwise, the DCDC converter is connected upstream of the energy store for voltage adaptation.

DETAILED DESCRIPTION OF THE PREFERRED EMBODIMENTS

Figure 1:
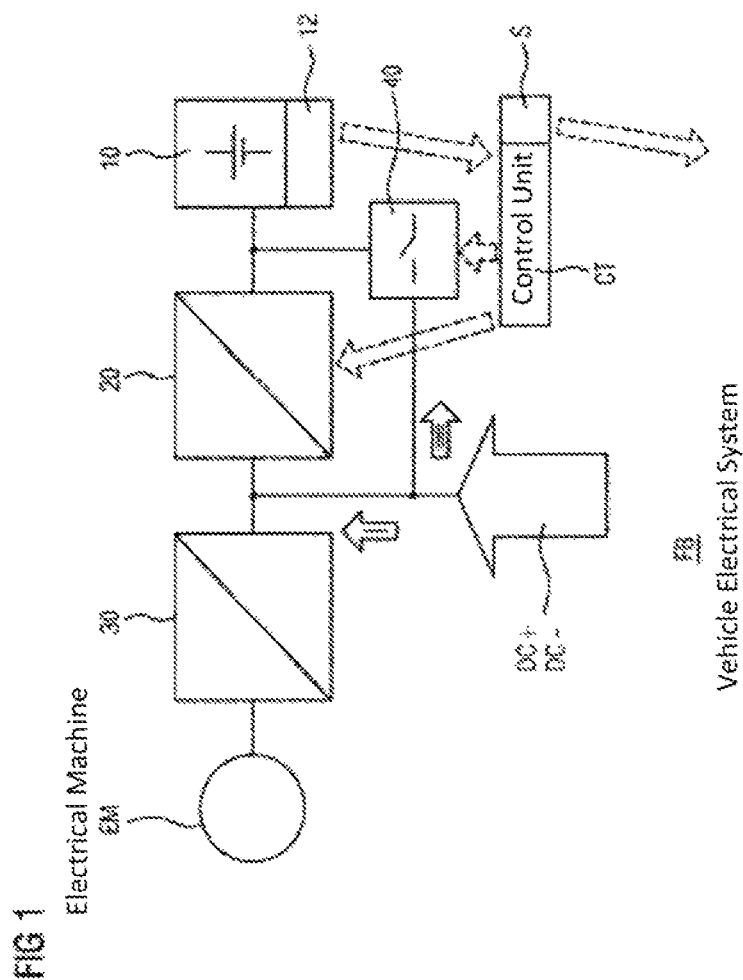
FIG. 1 illustrates a first embodiment of the present invention.
Figure 2:
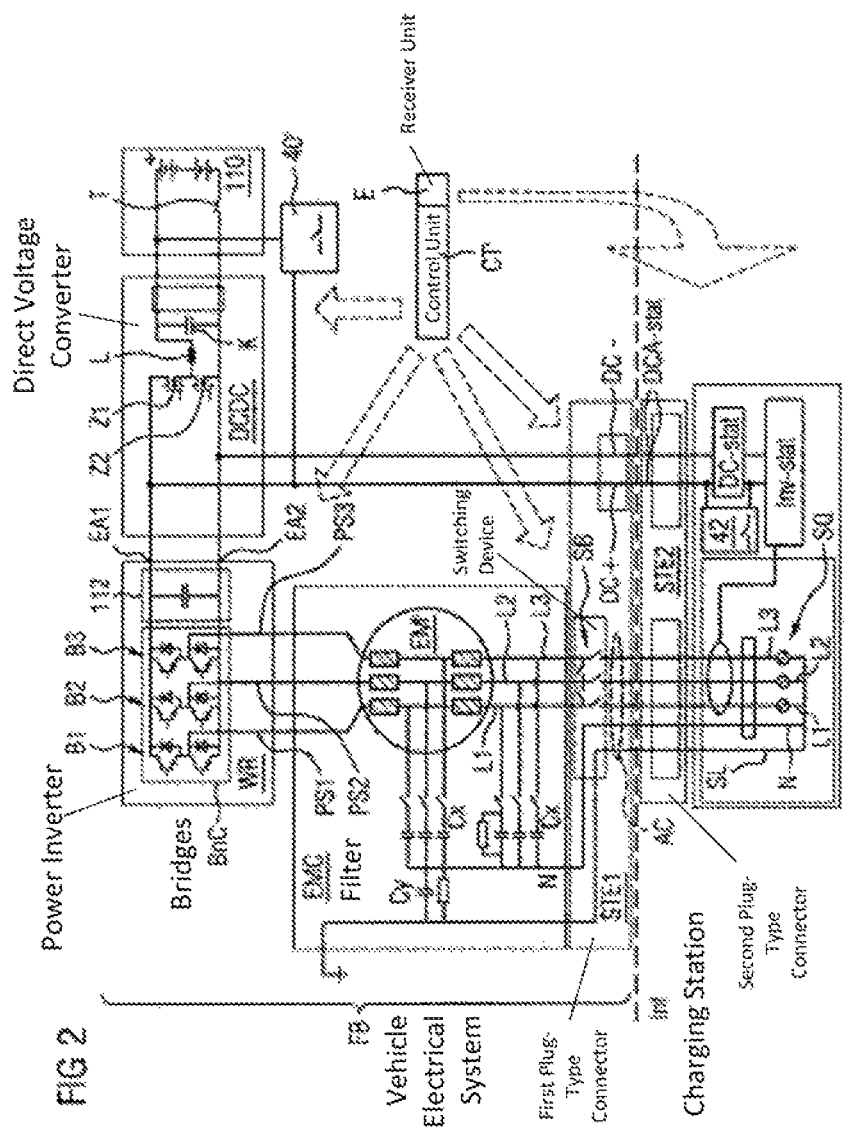
FIG. 2 illustrates a second embodiment of the present invention.
Figure 3:
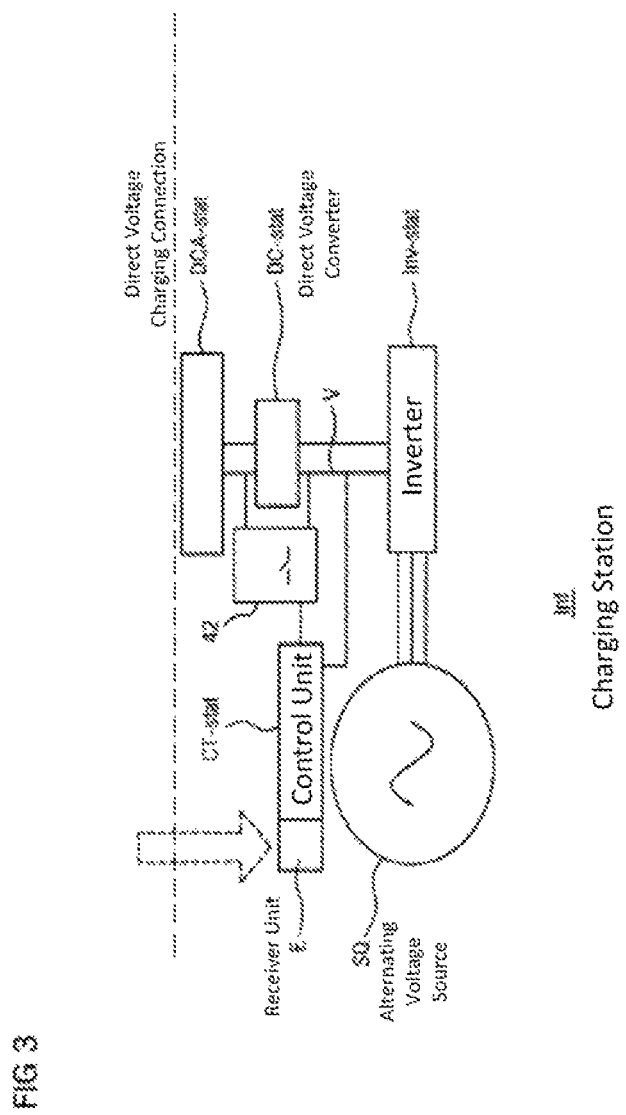
FIG. 3 illustrates the charging station of FIG. 2.

FIGS. 1, 2 and 3 serve to provide more detailed explanation of the devices and methods described here, and show (inter alia) exemplary vehicle electrical systems and charging stations.

FIGS. 1 and 2 each show embodiments of a vehicle electrical system FB having an energy store 10 or 110 and an electrical machine EM or EM' which are connected to one another via a power inverter 30 or WR. A direct current transmission connection DC+, DC− ("DC plug-in") has a positive rail DC+ and a negative rail DC−. A DCDC converter 20 or DCDC connects the DC plug-in to the energy store 10 or 110.

FIG. 1 illustrates a control unit CT which receives at least one signal (which characterizes the current absorption capacity of the energy store) from the energy store 10, see arrow directed to CT. The control unit CT is connected in an actuating fashion to the DCDC converter 20, and to the bypass switch 40.

If the bypass switch 40 is open, energy is transmitted via the DC plug-in DC+, DC− via the path I to the DCDC converter 20 which converts the energy, in particular by increasing or generally adapting the voltage to a (current) voltage of the energy store 10. If the bypass switch 40 is closed, energy is transmitted via the DC plug-in DC+, DC− to the energy store 10 via the path II and via the bypass switch 40 (which serves as a bypass of the DCDC converter 20), which converts the energy. If the deviation of the voltages between the energy store 10 and the direct voltage connection DC+, DC− is higher than a predetermined magnitude, the path I is selected. If the voltages are sufficiently equalized (i.e. the deviation does not exceed the magnitude), charging is not carried out indirectly via the DCDC converter 20 but rather directly via the bypass switch 40.

The electrical machine EM is connected via an inverter 30 to the DCDC converter 20, which electrical machine EM is supplied, for example in the driving mode (not illustrated), by the inverter 30 which in turn receives a voltage, increased by the DCDC converter, of the energy store 10. The charging mode is represented by the paths I and II. The path I is used at the start of the charging if the DCDC converter is necessary for voltage adaptation, since the voltage of the energy store and the voltage at the DC plug-in are too different. The path II is used in a following phase of the charging if the DCDC converter is no longer necessary for voltage adaptation, since the voltage of the energy store and the voltage at the DC plug-in are sufficiently close to one another, in order to avoid overloading of the energy store. The path II can represent a power level which is at least twice, three times or four times the power level of the path I. Correspondingly, the DCDC converter can be configured for a power level which is only a portion (not more than 50%, 30% or 20% or else not more than 10%), according to which power level the bypass switch is configured. The procedure described here can also be used for feeding back, in that power is fed back via the path I if the voltage of the energy store 10 deviates by more than a predetermined magnitude from the voltage at the DC plug-in DC+, DC−, and in that feeding back is carried out via the path II if the deviation of the voltage between the energy store 10 and the DC plug-in DC+, DC− does not exceed the magnitude.

In order to determine the voltage at the energy store 10, the control unit CT can be configured to determine the voltage by measurement at the energy store. In addition, the voltage at the energy store 10 can be determined by the control unit CT, by reception of a voltage value from a battery management unit 12 of the energy store 10. This is illustrated with the dashed-line arrow which is directed downward and toward the control unit CT.

The control unit CT can have a transmitter unit S in order to transmit the voltage state of the energy store 10 or a switched state of the bypass switch 40, for example to a charging station. This is illustrated with the dashed-line arrow which is directed downward and away from the control unit CT.

FIG. 2 illustrates a vehicle electrical system FB which is connected to a charging station Inf.

In the vehicle electrical system FB in FIG. 2, a power inverter WR is connected to a direct voltage converter DCDC via a positive input current connection EA1 of the power inverter WR and a negative input current connection EA2 of the power inverter WR. Connected in parallel with the input current terminals EA1, EA2 is an intermediate circuit capacitor 112. The inverter WR comprises three bridges B1-B3. A potential or a contact of a direct current transmission connection DC+, DC−, in particular the positive rail DC+, is connected to the direct voltage converter DCDC and is also connected to a positive input current connection EA1 of the power inverter WR.

FIG. 2 shows a power inverter with full bridges B1-B3, which are also referred to as two-pulse bridges, since each of the two half waves of a full wave is transmitted via one of the two switches of the respective bridge. In FIG. 2, the B6C bridge circuit, which is formed from the individual bridges B1-3, also referred to as BnC, wherein n is a placeholder for the number of switching elements (here: 3*2=6). FIG. 2 illustrates a power inverter WR1, which is incremented as a multi-phase full-wave bridge circuit. The power inverter WR is a B6C bridge circuit with an intermediate circuit capacitor 112.

The dashed line marks an interface between the vehicle electrical system and the fixed charging station Inf.

In FIG. 2, the power inverter WR is connected to the direct current transmission connection DC+, DC− via the electrical machine EM, indirectly via the direct current converter DCDC. As a result, voltage adaptation is possible, in particular overlapping voltage bands of the electrical machine EM and/or of the power inverter WR, on the one hand, and the energy store 110 on the other. The energy store 110 has, in addition to memory cells, an isolating switch T. The direct voltage converter DCDC has two serial switches Z1, Z2, to the linking point of which a serial inductor L is connected, which serial inductor L connects the serial switches Z1, Z2 to an intermediate circuit capacitor K of the direct voltage converter DCDC. The linking point between the switches Z1 and Z2 is connected to the positive pole + of the energy store 110 via the inductor L. The intermediate circuit capacitor K is also connected to the negative input current connection EA2; the positive input current connection EA1 is connected to the intermediate circuit capacitor K via the switch Z1 and the inductor. In particular, by virtue of the intermediately switched direct voltage converter DCDC, a voltage (for example, approximately 400 V) which is below the operating voltage (for example, approximately 800 V) of the energy store 110 becomes possible at the direct voltage connection DC+, DC−.

Electrical machine EM' in FIG. 2 comprises a winding system with three phases L1-L3 and with an intermediate tap in each of the windings, as a result of which each winding is divided in two. The division into two is not necessarily a division into equally long winding sections but rather is determined, in particular, according to the requirements which are made of a filter EMC. The filter EMC with the capacitors Cx and Cy is connected to the intermediate taps and to that winding end which is opposed to the power inverter WR2 or the phase connections PS1-3 thereof. Since the capacitors Cx and Cy interact with the windings of the electrical machine, the windings or sections thereof can represent part of the filter EMC in a functional view. The filter EMC is also connected to a neutral conductor N. The capacitors Cx, Cy in FIG. 2 and therefore the filter EMC can be disconnected from the electrical machine EM' (owing to series switches).

A switching device SB connects the electrical machine EM' or the phases L1-L3 thereof to an alternating current connection AC of the vehicle electrical system FB. The switching device SB comprises two switching elements or disconnection switches which connect the phases to one another in a controlled fashion, in particular in order to form a star point or break it up (preferably not completely). The switching device can have, in particular, just one disconnection switch which connects two windings. The remaining winding or windings is/are preferably connected to the other windings permanently or via a direct connection. In other words, the disconnection switches or the disconnection switch are/is connected in such way that in the case of an open switch or switches, an incomplete (star or triangle) configuration is obtained, or the configuration is completely broken up (by disconnecting all the winding ends from one another), wherein the isolating switches ensure that a direct current does not flow through all the windings. The control unit CT' can be connected in an actuating fashion to the switching device SB, in order to implement what has been mentioned above in the charging mode and/or feedback mode, and in order to connect all the windings to one another in a motor mode or generator mode (for example in order to produce a symmetrical or complete configuration). In addition, in the charging mode and/or feedback mode there can be provision that the control device actuates the switching device SB to transmit direct current through different windings and/or winding subgroups. The control device is configured for such actuation. As a result, the waste heat is generated more uniformly in the electrical machine.

The switching device SB also comprises one isolating switch per phase, and the sitting switches are connected between the electrical machine EM' and the oscillating current connection AC.

The interface (represented by dashed lines) is implemented by an electromechanical interface which forms a first plug-type connector STE1 at the vehicle electrical system FB end, and a plug-connector STE2 which is complementary thereto at the infrastructure INF end. The first plug-type connector is, in particular, part of a plug-in inlet. The second plug-type connector STE2 is fixed, in particular at the end of a charging cable of the charging station Inf. Power sources SQ for alternating current are provided at the charging station, which power sources SQ are intended to represent the access to an alternating current supply network. Three phases L1-L3 are formed as well as a neutral conductor N and a protective conductor SL. These have correspondences at the vehicle end, which have the same designations for the sake of better clarity.

The direct current connection DCA-stat of the charging station is connected via a direct voltage converter DC-stat of the charging station to an inverter or rectifier Inv-stat of the charging station Inf, which inverter or rectifier Inv-stat is in turn connected to an alternating current supply network. Alternatively, a direct voltage source can be provided, to which the direct voltage converter DC-stat is connected. The direct voltage converter DC-stat is connected in parallel with the switch 42, which in the closed state bypasses the direct voltage converter DC-stat. The control unit CT' (vehicle electrical system FB) also actuates this switch 42, irrespective of whether a closed state would cause overloading of the energy store 110 or of the DCDC converter DCDC of the vehicle electrical system (the switch 42 then remains open) or not (the switch 42 can then be closed).

The control unit CT' of the vehicle electrical system is configured to transfer the voltage state or a switched state of the energy store 110 or of the bypass switch 40' to this charging station Inf. This is illustrated by the bent dashed arrow.

FIG. 3 shows a charging station Inf with an inverter Inv-stat, a direct voltage charging connection DCA-stat and a direct voltage converter DC-stat. The inverter Inv-stat is connected to the fixed direct voltage charging connection DCA-stat via the direct voltage converter DC-stat. A fixed bypass switch 42 is connected in parallel or in a bypassing fashion to the fixed direct voltage converter DC-stat. FIG. 3 shows, in particular, the charging station which is illustrated in FIG. 2.

The charging station Inf has a control unit CT-stat. Said control unit is connected in an actuating fashion to the bypass switch 42. The control unit CT-stat has a receiver unit E. Said receiver unit is configured to receive a voltage state (of an energy store of a vehicle electrical system) or a switched state (of a bypass switch of a vehicle electrical system), for example from a transmitter unit S, as illustrated in FIG. 2. This is illustrated by the dashed double arrow in FIG. 3, which arrow corresponds in terms of content to the bent arrow in FIG. 2. The inverter Inv-stat connects the direct voltage converter DC-stat to a (three-phase) alternating voltage source SQ, which can correspond, in particular, to a connection to a public alternating current supply network or an alternating current supply network.

A connecting point V connects the inverter Inv-stat to the direct voltage converter DC-stat. The latter is connected (at least from a logical point of view) to the control unit CT-stat. The control unit CT-stat is thereby configured to determine the voltage at the connecting point V. In addition, the control unit CT-stat is configured to determine the voltage at the direct voltage charging connection DCA-stat. The control unit CT-stat is configured to determine a deviation between these voltages and to estimate whether this deviation exceeds a predetermined magnitude or not.

FIG. 1 serves to also explain a further embodiment or further function of the on-board electrical system described here. In one embodiment, the vehicle electrical system FB comprises an electrical energy store 10, a direct voltage converter 20 and a power inverter 30. The power inverter 30 is connected to the energy store 10 via the direct voltage converter 20. The vehicle electrical system FB also comprises an electrical machine EM. The electrical machine EM is connected downstream of the inverter 30. The vehicle electrical system FB also has a bypass switch 40 which connects the electrical energy store in a switchable fashion to the power inverter 30. The electrical machine is connected to the energy store via the inverter, in particular in a direct fashion, if the bypass switch 40 is closed, and in an indirect fashion via the direct voltage converter 20 (also referred to as DCDC converter) if the bypass switch 40 is open.

In this further embodiment, the vehicle electrical system FB comprises a control unit CT. The latter is connected in an actuating fashion to the bypass switch 40 and, in particular, to the direct voltage converter 20. The control unit CT can be configured to provide the direct voltage converter 20 in an inactive state if the bypass switch 40 is closed, and to provide the direct voltage converter 20 in an active state if the bypass switch 40 is open. The control unit CT can be configured to receive a boost signal. The control unit CT can be configured to provide the bypass switch 40 in a closed state if the boost signal is present The control unit CT can be configured to provide the bypass switch 40 in an open state if the boost signal is not present (for example if a complementary signal thereto is present). The control unit can have the functions mentioned in this paragraph, as well as functions which are described above or below. Alternatively, the control unit can have the functions mentioned in this paragraph and not the functions mentioned above or below, and a further control unit can be provided which has the functions mentioned above or below and not the functions mentioned in this paragraph. The control signals of the two control units can be OR-linked, in order to actuate the bypass switch in such a combination.

The boost signal is preferably suppressed or ignored by the control unit if the vehicle is not in a driving state. If the vehicle is in a driving state, the evaluation of the voltage state of the energy store, as is used during charging or feeding back, is ignored or not used to actuate the bypass switch 40. This is implemented, in particular, by the control unit CT.

The invention claimed is:

1. A vehicle electrical system comprising:
   an electrical energy store,
   a direct voltage converter and
   a direct current transmission connection, wherein the direct current transmission connection is connected to the electrical energy store via the direct voltage converter,
   a bypass switch which connects the electrical energy store in a switchable fashion to the direct voltage transmission connection, and
   a control unit which is connected to control switching of the bypass switch,
   wherein the control unit is connected to the electrical energy store and is configured to determine a voltage state thereof, and is connected to the direct current transmission connection and is configured to determine a voltage thereof, wherein
   the control unit is also configured to determine a voltage deviation between the voltage state of the electrical energy store and the voltage of the direct current transmission connection and to provide the bypass switch in a closed state if the voltage deviation is not greater than a predefined voltage magnitude, and to provide the bypass switch in an open state if the voltage deviation is greater than a predefined voltage magnitude.

2. The vehicle electrical system as claimed in claim 1, wherein the direct voltage transmission connection has a negative potential line which is connected to a negative connection terminal of the direct voltage converter, the direct voltage transmission connection has a positive potential line which is connected to a positive connection terminal of the direct voltage converter, and the bypass switch connects the positive connection terminal of the direct voltage converter to a positive pole of the electrical energy store.

3. The vehicle electrical system as claimed in claim 1, wherein the voltage state of the electrical energy store constitutes a value which represents a terminal voltage, an open-circuit voltage or a state of charge of the electrical energy store.

4. The vehicle electrical system as claimed in claim 3, wherein the control unit also has a transmitter unit which is configured to transmit the voltage state of the electrical energy store, the voltage deviation or a switched state of the bypass switch of the vehicle electrical system.

5. The vehicle electrical system as claimed in claim 1, wherein the control unit also has a transmitter unit which is configured to transmit the voltage state of the electrical energy store, the voltage deviation or a switched state of the bypass switch of the vehicle electrical system.

6. The vehicle electrical system as claimed in claim 1, wherein the predefined magnitude is not more than 5%, 2% or 1% of the nominal voltage of the electrical energy store.

7. The vehicle electrical system as claimed in claim 1, wherein the control unit is connected to control the direct voltage converter to configure the direct voltage converter to be in an inactive state in the case of a closed bypass switch and in an active state in the case of an open bypass switch.

8. A charging system comprising a vehicle and a charging station, wherein the vehicle has the vehicle electrical system as claimed in claim 1, and wherein the charging station has a fixed inverter, a fixed direct voltage charging connection and a fixed direct voltage converter, wherein a fixed bypass switching device is connected in parallel with the fixed direct voltage converter, and the charging system has a fixed control unit which is connected to control switching of the fixed bypass switching device.

9. The charging system as claimed in claim 8, wherein the charging station also has a receiver unit which is configured to receive the voltage state of the electrical energy store, the voltage deviation or a switched state of the bypass switch of the vehicle electrical system.

10. The charging system as claimed in claim 9, wherein the fixed control unit is connected to a connecting point between the fixed direct voltage charging connection and the fixed inverter and is configured to determine the voltage thereof, wherein
the fixed control unit is also configured to determine an other voltage deviation between the voltage state of the electrical energy store and the voltage of the connecting point and to provide the fixed bypass switching device in a closed state if the other voltage deviation is not greater than an other predefined voltage magnitude, and to provide the bypass switch in an open state if the other voltage deviation is greater than the other predefined voltage magnitude.

* * * * *